United States Patent Office 2,929,804
Patented Mar. 22, 1960

2,929,804

ELASTIC FILAMENTS OF LINEAR SEGMENTED POLYMERS

Walter Steuber, Media, Pa., assignor to E. I. du Pont de Nemours and Company, Wilmington, Del., a corporation of Delaware No Drawing. Application January 31, 1955
Serial No. 485,293

12 Claims. (Cl. 260—77.5)

This invention relates to filaments prepared from linear polymers comprising ureas linked to polyethers through urethane groups and especially to the elastic filaments obtained from certain of these compositions.

Attempts are constantly being made to overcome the deficiencies of fibers and filaments for many applications. For example, intensive efforts have been made in recent years to improve the dyeability and wearing comfort of the synthetic fibers. There is a particular need in the textile field for elastic filaments to replace rubber, which possesses a number of disadvantages for textile applications that tend to offset its desirable elastic properties. Accordingly, it would be desirable to provide new types of filaments which are highly elastic and which have a higher modulus and better abrasion resistance than rubber, but which do not possess its undesirable characteristics.

An object of this invention, therefore, is to provide new synthetic filaments which possess high elastic recovery. An additional object is to prepare filaments which have both a high polymer melt temperature and a low second order transition temperature. A further object is to prepare filaments from polymers which have been prepared under conditions which provide soluble linear polymers. These and other objects will be evident from the following discussion.

The objects of this invention are accomplished by utilizing a rapid, smooth polymerization technique which produces a linear polymer of the desired chemical composition and physical characteristics. As will be seen, the polymer is a copolyurea made, for example, by effecting reactions between monomeric diamines, diisocyanates, and a polyether glycol, the diamines being all or predominantly primary diamines. The preferred techniques are solution and interfacial polymerizations. The physical make-up of the polymer is such that the polymer has a high melt temperature and a low second order transition temperature. This is the first time filaments have been prepared from a polymer of this type. Physically, the polymer is composed of at least two segments: one segment which is crystalline and represents one or more repeating units of a polymer which melts above 200° C. in the fiber-forming molecular weight range (about 5000 or higher) and the second segment, chemically bonded to the first, which is also polymeric in nature but has a melting point below about 50° C. This latter segment is derived from a polyether glycol, and the high melting segment is a urea derived from a diamine. The presence of these segments is shown graphically in the X-ray diffraction patterns and studies of the polymers of this invention. The polyether glycol can be readily selected from a large list of known polyethers having known melting points, and the melting points and crystalline characteristics of urea segments prepared from the diamines are well known or readily determined. The reactants may be fed simultaneously to a reaction zone or the intermediates may be formed and condensed in any desired sequence.

Since the final products are derived from a polyether glycol and a urea linked by urethane groups, they are polyether/urethane/ureas. The amounts of the components are regulated and the elastomers which result are very readily shaped into elastic filaments.

In general, the filaments of the present invention have an essentially linear structure and are prepared from a segmented urea/urethane/ether copolymer consisting essentially of a multiplicity of urea segments containing at least one repeating unit of a fiber-forming polyurea. The repeating unit has the formula

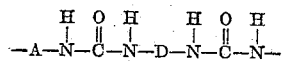

wherein —A— and —D— are bivalent organic radicals, with the polyurea having a melting point of at least 200° C. in the fiber-forming molecular weight range. At least some of the urea segments are connected by urethane linkages of the formula

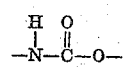

wherein the

of the urethane linkage is attached to the terminal radical —A— of the urea segment, to polyether residues which are the radicals remaining after removal of the terminal hydroxyl groups of a polyether glycol consisting essentially of divalent hydrocarbon groups joined by intralinear ether-oxygen atoms. The polyether glycol has a melting point below about 50° C. and a molecular weight above about 600. The urea segments constitute from about 10% to about 40% by weight of the segmented copolymer.

Thus, this invention provides linear copolymers comprising (1) urea segments or units prepared from complementary monomers capable of forming a fiber-forming polyurea or copolyurea with a polymer melt temperature of at least 200° C. in the fiber-forming molecular weight range linked through urethane groups to (2) a polyether with a molecular weight above about 600 (preferably between about 800 and about 5000) and a melting point below about 50° C. These polymers are obtained by reacting a polyether glycol or a derivative with one or more diprimary diamines or derivatives suitable for forming urethane linkages and the proper complementary molecules required to react with the diamines or derivatives to form a urea. Thus, the products are urea/urethanes in which one of the components is a polyether.

One of the monomers of part (1) must be a diprimary diamine or a derivative thereof. A small percentage of a disecondary diamine may be included. Usually, the products of composition (1) will be a homopolymer, but many monomers leading to copolymers are suitable. Component (2) is also usually a homopolymer, but frequently it is desirable to use a copolymer to modify the melting or solubility or other characteristics. Preparation of filaments from apparently similar products has not been demonstrated previously. The discovery of the melting point and molecular weight limitations on the macromolecular segments and the melting point limitation on the high melting segments has provided materials which are highly satisfactory for filament formation.

There are three reactions which may be considered as generally suitable for preparing the copolymers suitable for fabricating the filaments of this invention. These involve combinations of (1) a diisocyanate plus a diprimary diamine plus a polyether glycol, (2) a biscarbamyl chloride of a diprimary diamine plus a diprimary diamine plus a polyether glycol or its bis(haloformate), and (3) phosgene plus a diprimary diamine plus a polyether glycol.

In method (1) aliphatic diisocyanates, such as hexamethylene diisocyanate may be used but the aromatic diisocyanates, particularly p,p'-methylenediphenylisocyanate, are preferred.

Compositions which contain about 10% to about 40% by weight of the high melting segment or, conversely, about 60% to about 90% of the segment derived from the polyether glycol will be elastomers. The processes described herein can be used for making polymers outside this range but, in general, these do not result in elastic filaments as defined herein. It has been found that the best elastomers are produced when the difunctional macromolecule, i.e., the polyether glycol or its urethane-forming derivative, forms a segment which is substantially amorphous at room temperatures. Elastomers having polymer melt temperatures above 150° C. are preferred for filament formation.

The elastic filaments of this invention show high elastic recovery (above 90%), low stress decay (below 20%), and have a higher modulus than that of the rubber threads generally used in textile applications. Elastic recovery is the percentage return to original length within one minute after the tension has been released from a filament which has been elongated 50% at the rate of 100% per minute and held at 50% elongation for one minute. Stress decay is the percent loss in stress in a yarn one minute after it has been elongated to 50% at the rate of 100% per minute.

The high melting component of the polymers used to prepare these filaments is a urea, but as has been indicated previously, it is not essential that it be a homopolymer. Polymer compositions in which the high melting component contains a majority of urea segments which, when prepared as separate polymers, have polymer melt temperatures above 200° C. when the molecular weight is in the fiber-forming range are satisfactory. If the high melting component is a copolymer, it may be a copolyurea, or it may contain urethane, amide, or sulfonamide linkages. In many instances, the copolyureas are preferred. The preferred melting point for the high melting segment is dependent upon the length of this segment and to some extent upon the molecular weight of the polyether that is to be used. As the high melting segment becomes shorter, it is preferred that it be a unit of a higher melting polymer. For those copolymers in which the urea segment is reduced to the minimum (i.e., the polyether segments are separated by only a single unit of the polyurea), it is preferred that this be a unit of a polymer which melts above 250° C.

The polyether glycols may be homopolymers or copolymers. The essential features are that they be difunctional and have a melting point below 50° C. The polyethers are primarily poly(alkylene oxide) glycols but some of the oxygens may be replaced with sulfur atoms and/or some of the alkylene groups may be replaced with arylene or cycloaliphatic radicals. Even where the linkages and types of organic radicals are the same, the compositions may still be copolymers, such as a copolyether derived from more than one glycol. Copolymer formation is useful when a macromolecular homopolymer melts too high to be useful in the process. Copolymers usually melt lower and show less tendency to produce undesirable crystallization in this segment of the final copolymer. These macrointermediates may have hydroxyl or chloroformate end groups, as long as they are capable of reacting with one of the monomeric constituents of the high melting component to form a urethane linkage. However, polymers used in accordance with this invention are similar in filament-forming and in elastic properties, while polymers prepared outside the melting point or molecular weight limitations of this invention will differ in such properties.

The scope of the invention is readily understood by referring to the following examples, which are given for illustrative purposes only and should not be considered to represent the limits of the invention.

*Example I*

Poly(tetramethylene oxide) glycol (40 grams) with a molecular weight of 1,000 was reacted with 4.67 grams of 4-methyl-m-phenylene diisocyanate to produce the corresponding "trimer" with hydroxyl ends. This was reacted with 6.67 grams of p,p'-methylenediphenylisocyanate to provide the "trimer" with isocyanate ends. This product was dissolved in 100 ml. of N,N-dimethylformamide along with 3.73 grams of p,p'-methylenediphenylisocyanate. To this was added rapidly with vigorous stirring a solution of 5.28 grams of p,p'-diaminodiphenylmethane in 80 ml. of N,N-dimethylformamide. After 15 minutes reaction at room temperature, a polymer was obtained which had an inherent viscosity in hexamethylphosphoramide of 1.63 and which did not melt when heated up to 300° C. This polyurea urethane contained 20% by weight of p,p'-methylenediphenylurea units and 80% by weight of alternating copolyurethane units derived from the step-wise reaction of 4-methyl-m-phenylene diisocyanate and p,p'-methylenediphenylisocyanate with poly(tetramethylene oxide) glycol. Filaments could be prepared from this polymer with a tenacity of 0.56 g.p.d., an elongation of 1100%, an initial modulus of 0.35 g.p.d., a stress decay of 4%, and tensile recovery of 96%. A similar polymer is obtained by substituting the biscarbamyl halide of p,p'-diaminodiphenylmethane for the p,p'-methylenediphenylisocyanate. A similar product is also obtained by reacting this diamine with phosgene and the bischloroformate of the glycol.

*Example II*

The macroglycol (40 grams) from the preceding example was reacted with 4.67 grams of 4-methyl-m-phenylene diisocyanate to give a "trimer" with hydroxy ends. This was reacted with 6.67 grams of p,p'-methylenediphenylisocyanate to produce the corresponding "trimer" with isocyanate ends. This macro diisocyanate was dissolved in 100 ml. of N,N-dimethylformamide along with 5.83 grams of p,p'-methylenediphenylisocyanate. To this was added rapidly with vigorous stirring a solution of 5.28 grams of p,p'-diaminodiphenylmethane and 2.48 grams of p,p'-diaminodiphenylsulfone in 60 ml. of N,N-dimethylformamide. After 15 minutes reaction at room temperature, a polymer was obtained which had an inherent viscosity in hexamethylphosphoramide of 1.2 and which did not melt when heated up to 300° C. This copolyurea urethane contained 25% by weight of alternating polyurea units, one segment of which was derived from the reaction of p,p'-diaminodiphenylmethane with p,p'-methylenediphenylisocyanate and the other segment of which was derived from the reaction of p,p'-diaminodiphenylsulfone with p,p'-methylenediphenylisocyanate. It also contained 75% by weight of alternating polyurethane units derived from the step-wise reaction of poly(tetramethylene oxide) glycol with 4-methyl-m-phenlyene diisocyanate and p,p'-methylenediphenylisocyanate. Filaments could be prepared from this polymer with a tenacity of 0.55 g.p.d., an elongation of 750%, an initial modulus of 0.2 g.p.d., a stress decay of 7%, and a tensile recovery of 96%.

*Example III*

The macro glycol (60 grams) of the preceding example was heated at 85° C. with 5.25 grams of 4-methyl-m-phenylene diisocyanate for three hours with stirring to produce a "dimer" with hydroxy ends. To this product was added 15 grams of p,p'-methylenediphenylisocyanate and heating continued for one hour at 85° C. to produce the "dimer" with isocyanate ends. This product was dissolved in 168 grams of N,N-dimethylformamide and the resulting solution cooled in an ice bath to 0° C. To the cold, stirred solution was added 6 grams of p,p'-diaminodiphenylmethane dissolved in 100 grams of N,N-dimethylformamide. Stirring was continued for 15 minutes while allowing the reaction mixture to warm up to room temperature. This copolymer contained approximately 10% by weight of the symmetrical urea obtained from the reaction of p,p'-methylenediphenylisocyanate and p,p'-diaminodiphenylmethane, and approximately 90% by weight of the alternating polyurethane units derived from the step-wise reaction of poly(tetramethylene oxide) glycol with 4-methyl-m-phenylene diisocyanate and p,p'-methylenediphenylisocyanate. A solution of the polymer was obtained, which was dry spun directly through a five-hole spinneret at a temperature of 122° C. into air heated to 180° C. The multifilaments (2 denier per filament) were wound up at 125 y.p.m. and the as-spun filaments had the following properties: tenacity=0.8 g.p.d., elongation=742%, initial modulus=0.06 g.p.d., stress decay=4%, tensile recovery=100%, and fiber stick temperature=200° C.

Some of these filaments were drawn 5 times at room temperature and heat-set in boiling water. The resulting filament had a tenacity of 1.4 g.p.d., an elongation of 364%, an initial modulus of 0.10 g.p.d., a stress decay of 5%, a tensile recovery of 99%, and a fiber stick temperature of 200° C.

*Example IV*

The macro glycol (50 grams) of the preceding example was heated with 25 grams of p,p'-methylenediphenylisocyanate with stirring for one hour at 85° C. to provide the polyether with isocyanate ends. This product was dissolved in 160 grams of N,N-dimethylacetamide and the solution cooled in an ice bath to 0° C. To this was added with stirring 10 grams of p,p'-diaminodiphenylmethane dissolved in 100 grams of N,N-dimethylacetamide. The reaction mixture was stirred for 15 minutes while allowing it to warm up to room temperature. The copolymer contained approximately 20% by weight of the symmetrical urea derived from the reaction of p,p'-methylenediphenylisocyanate with p,p'-diaminodiphenylmethane and 80% by weight of the urethane derived from the reaction of poly(tetramethylene oxide)glycol with p,p'-methylenediphenylisocyanate. The viscous solution obtained was extruded directly through a 5-hole spinneret at a spinneret temperature of 130° C. into a column of air heated to 200° C. The multifilaments (2 d.p.f.) were wound up at 125 y.p.m. and had the following as-spun properties: tenacity=0.6 g.p.d., elongation=772%, initial modulus=0.36 g.p.d., stress decay=9%, tensile recovery=95%, and fiber stick temperature=210° C.

Some of these filaments were drawn 5 times at room temperature and heat-set in boiling water. The resulting filament had the following properties: tenacity=1.4 g.p.d., elongation=257%, initial modulus=0.29 g.p.d., stress decay=13%, tensile recovery=94%, and fiber stick temperature=210° C.

*Example V*

The macro glycol (60 grams) of the preceding example was reacted with 5.25 grams of 4-methyl-m-phenylene diisocyanate to produce a "dimer" with hydroxyl ends. The reaction was carried out by heating with stirring for three hours at 85° C. in the absence of solvents. The product was reacted with 15 grams of p,p'-methylenediphenylisocyanate to give the corresponding "dimer" with isocyanate ends. This product was obtained by heating for one hour at 85° C. with stirring in the absence of solvents. It was dissolved in 170 grams of N,N-dimethylformamide and the solution cooled to 0° C. To this was added with stirring 5.28 grams of benzidine dissolved in 80 ml. of N,N-dimethylformamide. Stirring was continued for 15 minutes while allowing the reaction mixture to warm up to room temperature. The copolymer obtained contained approximately 10% of the alternating copolyurea derived from the reaction of p,p'-methylenediphenylisocyanate with benzidine and approximately 90% by weight of alternating polyurethane units derived from the step-wise reaction of poly(tetramethylene oxide) glycol with 4-methyl-m-phenylene diisocyanate and p,p'-methylenediphenylisocyanate.

The product was obtained as a solution which was used directly for dry spinning. The solution was extruded through a five-hole spinneret, using a spinneret temperature of 124° C. and an air temperature in the column of 190° C. These multifilaments (2 d.p.f.) were wound up at 152 y.p.m. The as-spun filaments had the following properties: tenacity=0.60 g.p.d., elongation=833%, initial modulus=0.07 g.p.d., stress decay=7.9%, tensile recovery=96%, and fiber stick temperature=185° C.

Some of these filaments were drawn 4 times at room temperature and heat-set in boiling water. The resulting filament had the following properties: tenacity=1.0 g.p.d., elongation=482%, initial modulus=0.06 g.p.d., stress decay=5.8%, tensile recovery=96%, and fiber stick temperature=185° C.

*Example VI*

The macro glycol (100 grams) of the preceding example was heated with 8.7 grams of 4-methyl-m-phenylene diisocyanate with stirring for three hours at steam bath temperatures. This product was heated at steam bath temperatures with 50.0 grams of p,p'-methylenediphenylisocyanate for one hour with stirring. To this was added sufficient N,N-dimethylformamide (which had been distilled previously from 4-methyl-m-phenylene diisocyanate) to make a 20% solution. This reaction mixture was cooled to 0° C. and 6.1 grams of ethylenediamine added to the stirred solution. The reaction was allowed to continue while the mixture warmed up to room temperature. This polymer contained approximately 11% of the urea units derived from the reaction of ethylenediamine with p,p'-methylenediphenylisocyanate. The product was obtained in the form of a solution which was used directly for dry spinning through a five-hole spinneret. A spinneret temperature of 138° C. and an air column temperature of 150° C. was used. Talc was applied to the slightly tacky filaments, which were wound up at 150 y.p.m. The as-spun filaments had the following properties: tenacity=0.8 g.p.d., elongation=675%, initial modulus=0.05 g.p.d., denier=63, stress decay=2.3%, tensile recovery=99%, and fiber stick temperature=190° C.

*Example VII*

One mol of a "trimer" with hydroxyl ends from 3 mols of poly(tetramethylene oxide) glycol and 2 mols of 4-methyl-m-phenylene diisocyanate was reacted with about 2.3 mols of 4-methyl-m-phenylene diisocyanate. The resultant "trimer" with isocyanate ends was reacted with ethylenediamine at room temperature. The final polymer gave filaments having the following properties: tenacity=0.13 g.p.d., elongation=609%, initial modulus=0.03 g.p.d., denier=77, stress decay=6.8%, and tensile recovery=92%.

The expression "polymer melt temperature," as used here, is the minimum temperature at which a sample of the polymer leaves a wet, molten trial as it is stroked with moderate pressure across a smooth surface of a heated brass block. "Polymer melt temperature" has sometimes in the past been referred to as "polymer stick temperature." "Fiber stick temperature" is the temperature at which the fibers will just stick to a heated brass block when held against the surface of the block for five seconds with a 200-grams weight. "Initial modulus" is determined by measuring the initial slope of the stress strain curve.

The primary diamines used to prepare these polymers may be aliphatic, alicyclic, aromatic, or heterocyclic diamines. It is required that these diamines be combined with suitable coreactants to form a urea which melts above 200° C. Suitable diamines include ethylenediamine, tetramethylenediamine, pentamethylenediamine, hexamethylenediamine, heptamethylenediamine, octamethylenediamine, p-xylylenediamine, 1,4-diaminocyclohexane, p-phenylenediamine, 1-methyl-2,4-diaminobenzene, bis(p-aminocyclohexyl) methane, and many others. Derivatives of these diamines may also be used as long as the substituents do not interfere with the polymerization. For example, they may have hydrocarbon side chains or be substituted with halogens or nitro groups which are inert under the conditions used herein. The diamines may be used in the form of their bis(carbamyl halides), which can be reacted with diamines to form ureas.

Representative polyether glycols which may be used include polyoxathiaalkylene glycols, such as poly(1,4-dioxa-7-thianonane), poly(1-oxa-4-thiahexane), and poly(1,6-dioxa-9-thiahendecane); poly(alkylene oxide) glycols, such as poly(ethylene oxide) glycol, poly(propylene oxide) glycol, poly(tetramethylene oxide) glycol, and poly(decamethylene oxide) glycol; polydioxolane and polyformals prepared by reacting formaldehyde with other glycols or mixtures of glycols, such as tetramethylene glycol and pentamethylene glycol. Some of the alkylene radicals in these compositions may be replaced with arylene or cycloaliphatic radicals.

The preferred difunctional polyethers are poly(alkylene oxide) glycols, which may be represented by the formula

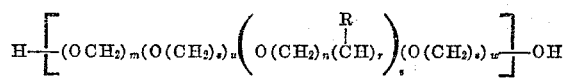

in which $m$ and $r$ are 0 or 1; $n$ is 2–10 when $r$ is 0 and 1–9 when $r$ is 1; $s$ is 0–10; $u$ and $w$ are 1–50; $v$ is 4–125; R is H or a low molecular weight alkyl group such as methyl. These polyethers may be used as the glycols, as shown, or they may be converted to the bis(haloformates), such as the bischloroformates, for example, by reacting with phosgene prior to use in preparing these polymers.

The halogen in the bis(haloformates) or in the bis(carbamyl halides) may be chlorine, bromine, iodine, or fluorine. Generally, this will be chlorine.

The preferred macrointermediate of this type is poly(tetramethylene oxide) glycol and/or its derivatives. Particularly useful are copolymers formed when a mol of this glycol is reacted with 2 mols of p,p'-methylenediphenylisocyanate and this derivative with isocyanate ends is reacted with ethylenediamine.

"Dimers" prepared by linking 2 mols of these glycols with 1 mol of a diisocyanate have been found to be particularly useful in preparing desirable copolymers. The corresponding "trimers" have also found many uses. Preparation of macromolecular segments with a larger number of glycol units has been achieved but no particular benefit has been observed. The "dimers" and "trimers" prepared by reacting poly(tetramethylene oxide) glycol with 4-methyl-m-phenylene diisocyanate or p,p'-methylenediphenylisocyanate have been found to be particularly useful when these products with hydroxyl ends are reacted with 2 mols of p,p'-methylenediphenylisocyanate and then reacted subsequently with a diamine, particularly ethylenediamine. The elastic products from these polymers have been found to be particularly satisfactory.

Three methods are known for preparing polymers of this type. They are: (1) melt polymerization, (2) interfacial polymerization, and (3) solution polymerization. Melt polymerization has generally not been found as satisfactory for preparing the linear fiber-forming copolymers of this invention when isocyanates are used and there are urea hydrogens present, since it is difficult to avoid gel formation and cross-linking. Very little gel formation or cross-linking can be tolerated in polymers which are to be used for filament formation.

Interfacial polymerization has rapidly been attaining increased importance in the polymer field. It is a rapid moderate temperature reaction in which the reactants are brought together in such a way that the reaction zone is at, or immediately adjacent to, a liquid-liquid interface. Thus, most of the molecules of at least one of the reactants must diffuse through liquid diluent to arrive at the reaction zone. For preparing the polymers of this invention the reactants in one liquid phase may be one or more of the diamines and the reactants in the other liquid phase may be one or more of the diisocyanates. Other combinations are possible, as has been indicated earlier. The two liquid phases are mixed to form a 2-phase system in which the diamine and the diisocyanate are in separate phases, at least one of which includes a liquid diluent. Preferably, a reactant is a liquid under the reaction conditions or is dissolved in a diluent, but one of the reactants may be dispersed or suspended as a finely divided solid in a diluent which will dissolve it, at least partially. The phases are mixed until the desired condensation polymerization has taken place and then, if desired, the polymers obtained are isolated.

Low molecular weight polymers have been prepared for some time by forming a homogeneous solution of the reactants and allowing the reaction to continue at moderate temperatures or heating to produce the polymers. However, only recently have high molecular weight polymers been prepared successfully by this method. The solution polymerization method used here for preparing polyureas involves, for example, dissolving diamines and diisocyanates in separate portions of the same solvent, and then mixing to form high molecular weight polymers. The molecular weight of the polymers is controlled by the choice of the solvent medium or by the use of mixtures of appropriate solvents. The solvent is one which is inert to the reactants and is usually selected to produce a high molecular weight polymer.

For optimum results, the copolyureas of this invention should have an inherent viscosity of the order of 1.0–4.0 or above, although copolymers having inherent viscosities as low as 0.5 are useful. Polymers in the lower molecular weight range are useful in certain applications such as in preparation of coatings and molded objects. However, the ones of particular interest are those with molecular weights in the fiber-forming range, i.e., above about 10,000. Inherent viscosity is defined as $$\frac{\ln \eta_r}{C}$$

in which $\eta_r$ is the viscosity of a dilute solution of the polymer divided by the viscosity of the solvent in the same units and at the same temperature, and C is the concentration in grams of the polymer per 100 ml. of solution. The inherent viscosities recorded here were usually measured in hexamethylphosphoramide. In most cases, a concentration of 0.5 gram per 100 ml. of solution was used.

When polymers are prepared by the interfacial or solution methods, the polymers frequently separate as soon as they have reached an adequate molecular weight value. If this does not happen, the polymer can be separated by the addition of a precipitating and/or coagulating agent. However, it is possible to prepare concentrated solutions of many of these polymers by the use of these techniques, and such solutions can be used directly in the preparation of filaments, bristles, and similar articles.

This invention represents an important development in that it demonstrates for the first time that useful filaments are obtainable from polymers of the type described herein in which polymers have both a high polymer melt temperature and a low glass or second order transition temperature. A number of rubbery polymers with relatively low second order transition temperatures have been prepared. These polymers have invariably had low polymer melt temperatures and tended to creep on extension. Therefore, it has usually been necessary to cross-link them in order to obtain good elastic properties. These limitations have restricted their usefulness. For example, the insolubility and infusibility of the cross-linked products make subsequent shaping difficult. Polymers with high polymer melt temperatures also have had, in the past, high second order transition temperatures, which means that they tend to be non-elastic at room temperatures. The transition temperature can be lowered and the room temperature elasticity correspondingly increased through copolymer formation. However, this has invariably led to a large drop in the polymer melt temperature.

The elastic filaments of this invention are unique in that they are derived from linear polymers with properties equivalent to those of the cured cross-linked elastic products now available. This has been accomplished by substituting crystalline regions of the high melting components to replace the chemical cross-links of cured elastomers, such as rubber. The absence of chemical cross-links results in improved solubility. The practical end result is that these polymers can be dissolved in fairly common solvents in sufficient concentration that the solutions can be readily adapted to the preparation of filaments.

The filaments of this invention have properties which make them useful in such applications as fabrics, fishing lines, rope, papers, felts, among others. The elastic filaments of this invention are useful as binders in papers and laminates. The filaments from the elastic copolyureas are a particularly desirable feature. The best filaments of this invention exhibit stress decay properties equivalent to those of rubber. The higher tenacities, high initial modulus, superior abrasion resistance, and more easily controlled elongation of these filaments fit them for many applications for which rubber filaments are undesirable. Most of these filaments possess the additional advantage that they are easily fabricated. A large percentage of the rubber threads used are prepared by slitting rubber sheets. This produces relatively large denier filaments, which cannot be converted readily to multifilaments, and are not acceptable for many uses, particularly in certain fabrics. Finer denier monofilaments and multifilaments can be prepared by extruding and coagulating rubber dispersions, but this process has proved to be expensive and the product is frequently unsatisfactory. Both types of rubber filaments have poor abrasion resistance.

Some of these copolyureas also possess the desirable characteristic of being hydrophilic. The ability to absorb moisture is desirable for a textile fiber because of the fact that the fabrics made from them are more comfortable to wear. The low moisture absorption of many of the hydrophobic fibers now available is undesirable in many applications.

The filaments of this invention are more resistant to attack by oxygen than any other class of the elastomers known. However, it is sometimes necessary to stabilize certain of the compositions to heat or radiation by ultraviolet light. Fortunately this can be done very readily by incorporating stabilizers. Satisfactory stabilizers comprise phenols and their derivatives, amines and their derivatives, compounds containing both hydroxyl and amine groups, hydroxyazines, oximes, polymeric phenolic esters, and salts of multivalent metals in which the metal is in its lower valence state. An extensive list of suitable stabilizers is given in copending application, Shivers, Serial No. 329,114, filed December 31, 1952.

Filaments can be prepared by melt, dry or wet spinning. In melt spinning, care should be taken to avoid thermal degradation. In shaping filaments using solutions, solvents which have been found satisfactory for preparing solutions of suitable concentration for dry spinning are N,N-dimethylformamide, N,N-dimethylacetamide, tetramethylene cyclic sulfone, formic acid, and and 60/40 trichloroethane/formic acid mixtures.

Conventional conditions are used for dry spinning, except that the elastic filaments usually have to be talced or lubricated, usually with water, because they tend to be somewhat tacky immediately after extrusion. Spinning speeds are usually lower than those used in some commercial dry spinning processes for textile filaments, although speeds in excess of 300 yards per minute have been attained with elastic filaments, which represent excellent productivity for filaments of this type.

When wet spinning, the spinning speeds are usually lower, but this procedure has a definite advantage when larger denier filaments are being prepared. A preferred solvent for wet spinning is N,N-dimethylformamide and these solutions are usually extruded into a hot water bath.

It is possible to prepare stable dispersions of these polymers (particularly the elastomers), and shaped articles can be prepared by extruding, coagulating the dispersion, and coalescing the polymer particles. In some instances, heat coalescence is satisfactory, whereas for others, a solvent will have to be used to promote coalescence. Shaping and polymerization can also be combined into a single step.

A drawing operation is usually not necessary to develop desirable properties, particularly satisfactory elastic properties, in these filaments. However, the over all properties of the filaments prepared from many of these copolyureas are frequently improved by a cold drawing operation, which results in increased orientation and crystallinity in the final structure. Therefore, prior to final packaging, the yarns are drawn at a suitable draw ratio, such as 2 to 10 times, for the particular copolymer, and relaxed, to give a product with a desired combination of tenacity, initial modulus, yarn elongation, elasticity, and similar properties.

The elastic polymer yarns of this invention are characterized by higher strength and stretch modulus and substantially better abrasion resistance than any rubber threads known. Stretch modulus measures the force required to elongate the yarn a given percentage. A garment made of yarns having high tenacity and high stretch modulus will not only be durable but will also exert substantial pressure on the body of the wearer after the garment is stretched into position as desired, for example, in surgical stockings.

Yarns of this invention have many advantages over rubber threads. For example, they may be spun readily into multifilament yarns and into low denier filaments. They have superior abrasion resistance, very low inherent color, may be dyed by common dyestuffs, need no plasticizers which might later be leached out of the yarn, and have a good resistance to perspiration or greases and many other common chemicals. The superior abrasion resistance of the filaments of this invention was demonstrated by the following test. A 440 denier rubber thread and an 88 denier copolymer filament of this invention were loaded with a weight equal to 0.01 g.p.d. and abraded against a 15° sector of a shaft of a "Lightning" stirrer covered with Carborundum paper and rotating at 1778 r.p.m. The average breaking time for the rubber thread was 68±5 seconds, while the copolymer filament had an average breaking time of 5 hours and 43 minutes. Furthermore, these elastic yarns are capable of very quick elastic recovery, a property which is lacking in many of the so-called elastic fibers.

The elastic properties attained by this invention result in part from the novel combination of a segment of a "hard" or high melting polymer with a "soft" or low melting polymeric segment. The polymers from which the former segments are derived all melt above 200° C., some melting points being exemplified as follows: poly(p,p'-methylenediphenyl urea), 305° C. with decomposition; copolyurea from ethylenediamine and 4-methyl-m-phenylenediisocyanate, 292° C.; and copolyurea from hexamethylenediamine and 4-methyl-m-phenylenediisocyanate, 245° C. The melting points of the polyether glycols are below about 50° C., as for example, poly(tetramethylene oxide) glycol having an average molecular weight of 1000, about 20° C.; poly(tetramethylene oxide) glycol having a molecular weight of 1500, about 30° C.; and poly(tetramethylene oxide) glycol of 3000 molecular weight, about 40° C. The melting points of the polyether glycols are generally not sharp and may vary for a given molecular weight. Thus, some samples of the higher molecular weight polyether glycols may have apparent melting points as high as 55° C. The "hard" segments may be combined with the low melting segments to produce a large number of the elastomers of this invention.

It will be apparent that many widely different embodiments of this invention may be made without departing from the spirit and scope thereof, and therefore it is not intended to be limited except as indicated in the appended claims.

I claim:

1. A filament having an elastic recovery above about 90%, a stress decay below about 20%, and an essentially linear structure of a segmented urea/urethane/ether copolymer having a polymer melt temperature above 150° C. and an inherent viscosity of at least 1 as measured in a solution of hexamethylphosphoramide having a concentration of 0.5 gram per 100 ml. of solution, said copolymer consisting essentially of a multiplicity of urea segments containing at least one repeating unit of a fiber-forming polyurea, said repeating unit being of the formula

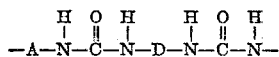

wherein —A— and —D— are bivalent organic radicals, the said polyurea having a melting point of at least 200° C. in the fiber-forming molecular weight range, at least some of said urea segments being connected by urethane linkages of the formula

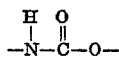

wherein the

of the urethane linkage is attached to the terminal radical —A— of the said urea segment, to polyether residues which are the radicals remaining after removal of the terminal hydroxyl groups of a polyether glycol consisting essentially of divalent hydrocarbon groups joined by intralinear ether-oxygen atoms, said polyether glycol having a melting point below about 50° C. and a molecular weight above about 600, said urea segments constituting from about 10% to about 40% by weight of said copolymer.

2. The filament of claim 1 in which said polyether glycol is a poly(alkylene oxide) glycol.

3. The filament of claim 2 in which said poly(alkylene oxide) glycol is a poly(tetramethylene oxide) glycol.

4. The filament of claim 1 in which said polyether glycol has a molecular weight between 800 and 5000.

5. The filament of claim 1 in which said bivalent organic radical —A— is an aromatic radical remaining after removal of the —NCO groups from an aromatic diisocyanate.

6. The filament of claim 5 in which said aromatic diisocyanate is a symmetrical aromatic diisocyanate.

7. The filament of claim 1 in which said bivalent organic radical —D— is a bivalent organic radical remaining after removal of the —NH₂ groups from a primary aliphatic diamine and said bivalent organic radical —A— is a symmetrical aromatic radical remaining after removal of the —NCO groups from a symmetrical aromatic diisocyanate.

8. A filament of a linear segmented polymer having an elastic recovery of above about 90%, a stress decay below about 20%, and an essentially linear polymeric structure consisting of urea segments chemically connected through urethane linkages to polyether segments, said urea segments containing at least one repeating unit of a urea polymer prepared from a primary organic diamine and a complementary monomer capable of forming with said diamine a linear crystalline urea polymer having a melting point above 200° C. in the molecular weight range above 5000, said complementary monomer being selected from the group consisting of an organic diisocyanate, a biscarbamyl halide of a primary organic diamine, and phosgene, said polyether segments being the residues remaining after removal of the terminal hydroxyl groups of a difunctional hydroxyl-terminated polyether having a melting point below 50° C. and a molecular weight above about 600, said difunctional hydroxyl-terminated polyether being selected from the group consisting of poly(alkylene oxide) glycols, poly(alkylene arylene oxide) glycols, poly(alkylene cycloalkylene oxide) glycols, poly(oxathiaalkylene) glycols, polydioxolane, and said glycols which contain a minor proportion of urethane linkages, said urea/segments being present in an amount from about 10% to about 40% by weight of said segmented polymer, said polymer having a melt temperature above 150° C. and an inherent viscosity of at least 1 as measured in a solution of hexamethylphopsphoramide having a concentration of 0.5 gram per 100 ml. of solution.

9. The process of preparing filaments having an elastic recovery above about 90%, a stress decay below about 20%, and an essentially linear polymeric structure which consists of reacting a difunctional hydroxyl-terminated poyether having a molecular weight above about 600 and a melt.ng point below about 50° C. with an organic diisocyanate in a molar ratio greater than 1:1 to produce a low molecular weight polymer having terminal hydroxyl groups, reacting the hydroxyl-terminated product with at least two moles of an organic diisocyanate to produce an isocyanate-terminated polymer, and thereafter reacting the resulting isocyanate-terminated polymer with an essentially stoichiometric amount of a diprimary diamine to provide a final product having a polymer melt temperature above 150° C. and an inherent viscosity of at least 1 as measured in a solution of hexamethylphosphoramide having a concentration of 0.5 gram of said final product per 100 ml. of solution, said diisocyanate and said diprimary diamine being complementary monomers capable of forming a linear urea polymer having a melting point above 200° C. in the molecular weight range above 5000, said low molecular weight polymer being present in the final product in an amount from about 60% to about 90% by weight, shaping said filament by extruding said final product through an orifice.

10. The process of claim 9 wherein said difunctional hydroxyl-terminated polyether is a poly(alkylene oxide) glycol.

11. The process of preparing filaments having an elastic recovery above about 90%, a stress decay below about 20%, and an essentially linear polymeric structure which consists of reacting a difunctional hydroxyl-terminated polyether having a molecular weight above about 600 and a melting point below about 50° C. with an organic diisocyanate in a molar ratio of less than 1:1 to produce a low molecular weight isocyanate-terminated polymer, and thereafter reacting the resulting isocyanate-terminated polymer with an essentially stoichiometric amount of a primary diamine to provide a final product having a polymer melt temperature above 150° C. and an inherent viscosity of at least 1 as measured in a solution of hexamethylphosphoramide having a concentration of 0.5 gram of said final product per 100 ml of solution, said diisocyanate and said diamine being complementary monomers capable of forming a linear urea polymer having a melting point above 200° C. in the molecular weight range above 5000, said polyether being present in the final product in an amount from about 60% to about 90% by weight, and shaping said filament by extruding said final product through an orifice.

12. The process of claim 11 wherein said difunctional hydroxyl-terminated polyether is a poly(alkylene oxide) glycol.

References Cited in the file of this patent

UNITED STATES PATENTS

| 2,692,874 | Langerak | Oct. 26, 1954 |
| 2,843,568 | Benning | July 15, 1958 |

FOREIGN PATENTS

| 18,733 | South Africa | Feb. 1, 1954 |
| 519,014 | Belgium | Oct. 5, 1954 |
| 876,906 | France | Aug. 24, 1942 |
| 1,074,451 | France | Mar. 31, 1954 |

UNITED STATES PATENT OFFICE
CERTIFICATE OF CORRECTION

Patent No. 2,929,804                                          March 22, 1960

Walter Steuber

It is hereby certified that error appears in the printed specification of the above numbered patent requiring correction and that the said Letters Patent should read as corrected below.

Column 6, line 66, for "trial" read -- trail --; column 12, line 26, for "urea/segments" read -- urea segments --.

Signed and sealed this 30th day of August 1960.

(SEAL)
Attest:

ERNEST W. SWIDER                                     ROBERT C. WATSON
Attesting Officer                                       Commissioner of Patents